Oct. 14, 1969   J. FLOYMAYR   3,472,941
CORELESS INDUCTION FURNACE AND METHOD OF MELTING
AND STIRRING METALS IN THIS FURNACE
Filed Feb. 13, 1967
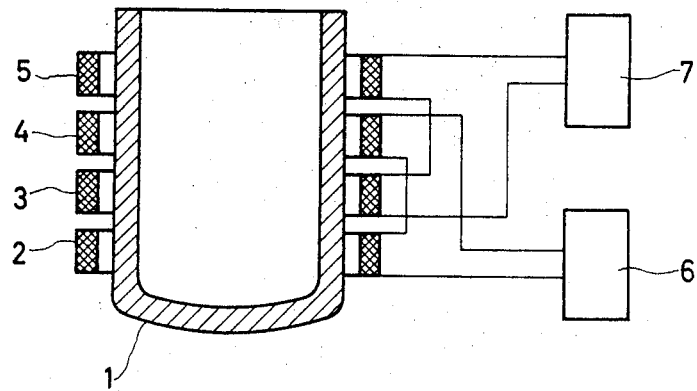
Inventor
Joachim FLOYMAYR
By
Joseph + Padlon
Attorney

United States Patent Office

3,472,941
Patented Oct. 14, 1969

3,472,941
CORELESS INDUCTION FURNACE AND METHOD OF MELTING AND STIRRING METALS IN THIS FURNACE
Joachim Floymayr, Hanau am Main, Germany, assignor to Leybold-Heraeus GmbH & Co., Cologne-Bayental, Germany
Filed Feb. 13, 1967, Ser. No. 615,812
Claims priority, application Germany, Feb. 15, 1966, H 58,553
Int. Cl. H05b 5/16, 5/18
U.S. Cl. 13—26         1 Claim

ABSTRACT OF THE DISCLOSURE

A coreless induction furnace and a method of melting metals and thereafter stirring the molten metal in this furnace, wherein the crucible of this furnace is surrounded by a plurality of induction coils which for the melting operation are energized by at least two equal current-supply units in phase coincidence, while for subsequently stirring the molten metal, the phases of these same supply units are shifted relative to each other.

BACKGROUND OF THE INVENTION

The present invention relates to a method of melting metals in a coreless induction furnace, and more particularly in a vacuum induction furnace, and of subsequently stirring the molten metal, preferably under a vacuum, within this furnace, and it further relates to an induction furnace which is especially designed for carrying out this method.

In the operation of induction furnaces for melting metals it is often very desirable for metallurgical reasons to stir the liquid metal after it has been melted completely in order to render the material as homogeneous as possible. If this stirring process is carried out under a vacuum, the additional advantage may be attained that the liquid metal will also be degassed.

It is already known to employ a coreless induction furnace for melting a metal and for also stirring the molten metal therein. For heating the metal, this known method employs a high-frequency current, while for agitating the bath of molten metal a low-frequency current is used. The induction coil surrounding the crucible consists of a unit of several smaller coils which for stirring the molten metal are connected and energized in a manner so as to produce an internal flow and wave motion within the molten metal. Since each of the processes of melting and stirring the metal requires a different type of current, it is also necessary to provide two independent current sources, namely, one for producing a high-frequency current and one for producing a low-frequency current. The stirring motion of the molten metal may be produced and controlled by varying the voltages of the low-frequency current which are supplied to the induction-coil unit and/or by varying the phase relationship of the current-supply units which are required solely for effecting this stirring motion. Furthermore, this known method requires additional electric control means, for example, choke circuits, for preventing the high-frequency currents from entering the low-frequency circuit and the low-frequency circuit from entering the high-frequency circuit. It is therefore quite evident that the apparatus which is required to carry out this known method is very expensive.

SUMMARY OF THE INVENTION

It is an object of the present invention to provide a new method of melting metal and subsequently stirring the molten metal by induction, which permits both functions to be carried out very easily and effectively and by means of a much more simple and inexpensive apparatus than the apparatus which is required for carrying out the conventional method as above described. A further object of the invention is to provide a coreless induction furnace which is especially designed for carrying out this new method.

Like the known method, the method according to the invention also employs a coreless induction furnace, preferably a vacuum induction furnace, for melting a metal and for thereafter stirring the molten metal, preferably under a vacuum. For both operations of melting and stirring the metal, this furnace likewise comprises a crucible and a unit of several induction coils which surrounds the crucible and is energized for the stirring operation in a manner so as to produce a wave motion within the molten metal. For attaining the abovementioned objects, the new method, however, provides that for both operation of melting the metal and of thereafter stirring the same, the induction-coil unit is supplied by only one source of current of the same frequency, that this source of current is divided into two or more equal current-supply units, and that for the melting operation the primary sides of these current-supply units are in phase coincidence, while for the subsequent stirring operation the phases of these same current-supply units are turned relative to each other. The method according to the invention therefore requires only one source of current of the same frequency, and for carrying out this method it is immaterial which frequency is to be used.

The new method has the advantage over the known method as previously described that the required apparatus is much more simple and inexpensive since the same source of current may be used for both operations of melting the metal and of thereafter stirring the molten metal and since this single source is composed of two or more current-supply units which may be of an identical construction. Special electric means as are required by the known method for operating the furnace with a low-frequency as well as a high-frequency current are therefore no longer required.

The features and advantages of the present invention will become more clearly apparent from the following detailed description of an induction furnace which is designed in accordance with the invention for carrying out the new method and which is illustrated diagrammatically and in cross section in the accompanying drawing.

This induction furnace comprises a crucible 1 which is surrounded by a plurality of induction coils 2, 3, 4, and 5 which together form a unit. The alternate induction coils 2 and 4 and 3 and 5, respectively, are connected in series. The common source of electric current for energizing the induction-coil unit is composed of two equal current-supply units 6 and 7 each of which supplies one half of the total power required. Coils 2 and 4 are supplied by the unit 6 and coils 3 and 5 by the unit 7. For carrying out the inductive melting operation, both units 6 and 7 and thus also all four induction coils 2 to 5 have the same phase relationship. However, for stirring the liquid metal after it has been melted completely, the phase of one of the two current-supplying units is electrically turned at the primary side, for example, at an angle of 90°, relative to the phase of the other unit. This results in the formation of a wave motion within the molten metal. The operation of the induction furnace as above described constitutes a melting operation which is followed by a two-phase stirring operation. If more than two phases are to be employed for the stirring operation, the source of current is to be composed of a number of equal current-supply units in accordance with the number of phases desired which are to be turned at equal angles relative to each other. Each supply unit should then have an output corresponding to the total output of the entire source of current divided by the number of phases. This, in turn, means that the induction-coil unit must be divided into so many individual coils that the number of these coils will be equal to twice the number of phases. If the melting process is to be followed by a three-phase stirring process, the source of current is therefore to be divided into three equal supply units each of which has an output of one third of the total output of the common source. The induction-coil unit is then to be divided into six individual coils.

Although my invention has been illustrated and described with reference to the preferred embodiments thereof, I wish to have it understood that it is in no way limited to the details of such embodiments but is capable of numerous modifications within the scope of the appended claim.

Having thus fully disclosed my invention, what I claim is:

1. In a coreless induction furnace for melting metal and for subsequently stirring the molten metal, comprising a crucible, a plurality of induction coils together forming an induction-coil unit surrounding said crucible, and at least two current-supply units for energizing said induction-coil unit, wherein the improvement consists in that said current-supply units are equal to each other and consist of a number of such units equal to the number of phases to be employed for the stirring process, that each of said supply units has an electric output of a size equal to the total output of all of said supply units divided by the number of phases, and that said coil unit consists of a number of said individual coils equal to twice the number of said phases.

References Cited
UNITED STATES PATENTS

| | | | |
|---|---|---|---|
| 2,759,035 | 8/1956 | Dreyfus | 13—26 |
| 3,331,909 | 7/1967 | Kasper | 219—10.75 X |
| 3,382,311 | 5/1968 | Rydinger et al. | 13—26 |
| 3,414,659 | 12/1968 | Kennedy | 13—26 |

BERNARD A. GILHEANY, Primary Examiner

H. B. GILSON, Assistant Examiner

U.S. Cl. X.R.

75—10; 219—10.75